Figure 1:
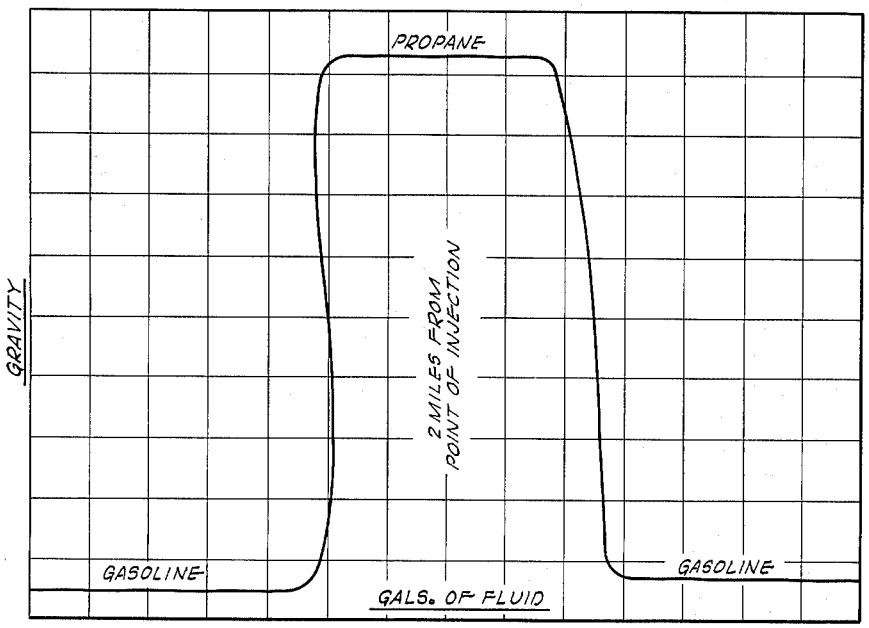

INVENTORS
RICHARD L. EVERY &
TIBOR O. EDMOND
RAYMOND D. PHILLIPS
BY
ATTORNEY

INVENTORS
RICHARD L. EVERY &
TIBOR O. EDMOND
RAYMOND D. PHILLIPS
BY
ATTORNEY

United States Patent Office 3,198,201
Patented Aug. 3, 1965

3,198,201
METHOD FOR SIMULTANEOUSLY TRANSPORTING TWO IMMISCIBLE FLUIDS BY PIPELINE
Richard L. Every, Tibor O. Edmond, and Raymond D. Phillips, Ponca City, Okla., assignors to Continental Oil Company, Ponca City, Okla., a corporation of Delaware
Filed June 8, 1962, Ser. No. 201,045
8 Claims. (Cl. 137—1)

This invention relates to a method for simultaneously transporting two fluids which are immiscible in each other through a common pipeline. Differently described, the invention relates to a method for preventing or substantially reducing overriding or stratification of the type which occurs at the interface between two contiguous, immiscible fluids which are being moved through a pipeline.

It is known that when two fluids are transported through a pipeline in juxtaposition to each other, the interface between the two fluids will rarely, if ever, be a well defined boundary lying in a plane extending transversely through the pipeline. Several types of deviation from such an "ideal" interface are known to occur. One of these deviations from ideality occurs when two viscous fluids of comparable density or viscosity are pumped successively through a pipeline at a rate sufficienly slow to permit these fluids to flow laminarly rather than, and as opposed to, turbulently. In this situation, the fluids tend to telescope in the pipeline; that is, the portion of each of the fluids which is nearer the center or axis of the pipeline moves faster than that portion of each fluid which is adjacent the walls of the pipeline. Because of this telescoping, the interface between the two fluids becomes concavo-convex with the leading end of the trailing or second fluid protruding forward into the recessed tail of the leading fluid. Since the telescoping effect is amplified as the distance which the fluids are flowed increases, it is apparent that the total area of the concavo-convex interface may become enormous when the fluids are pumped over relatively long distances, and the intermixing of the liquids becomes extensive, making separations and purification time consuming and difficult.

A second type of interface distortion which may result is that which occurs when two miscible fluids are flowed through a pipeline in contiguous relation to each other. Due to the proximity of the fluids to each other, some intermixing invariably occurs at the interface. However, the extent and nature of this intermixing is ordinarily such that no major practical difficulties are encountered.

Yet another and different type of interface distortion which may occur in the pipeline transport of two fluids is that resutling from the simultaneous shipment of two immiscible fluids. Here the fluids stratify vertically with the less dense of the fluids overriding the more dense fluid. The extent of stratification increases in proportion to the distance over which the fluids travel in the pipeline. Even when the densities of the two fluids are relatively close, and even when both of them move in turbulent flow, stratification still occurs. This stratification results in the overriding fluid being held up or retained at high points in the pipeline, while the lower strata will be retained or retarded in the lower portions or dips in the pipeline. So severe may be the stratification and mixing which occurs during the shipment of two immiscible liquids that fluid adulteration and the prohibitive economics of separation may make it entirely unfeasible to simultaneously ship the two immiscible fluids by pipline.

With respect to the first type of interface distortion discussed above—that occurring when two fluids are pumped through the pipeline in laminar or streamline flow—a solution to the problems stemming from this type of "telescoping" intermixing has been proposed by Benjamin E. Gordon and is described in his U.S. Patent No. 2,953,146. According to the Gordon technique, a light fluid of low viscosity is positioned between the two miscible, viscous fluids which it is desired to transport through the pipeline at a rate such that these two fluids will move in laminar flow. An essential requirement of Gordon's intermediate fluid is that it have a viscosity which is sufficiently lower than the viscosity of the fluids it separates to assure that the intermediate fluid will move in turbulent flow, or display a Reynolds number substantially above 2000, while the two separated fluids are moving in laminar flow. Stated differently, the difference in viscosity which exists between the intermediate fluid and the two fluids which are separated thereby must be sufficiently great to allow the three fluids to be simultaneously transported in a common pipeline with the two separated fluids flowing laminarly and the intermediate fluid flowing turbulently in the pipeline.

There remains the lastly described type of interface distortion which continues to pose a serious intermixing problem. It is to this problem, arising as it does from the pipeline transport of two immiscible fluids, that the present invention is addressed. By the process of the invention, we have been able to eliminate intermixing resulting from the overriding of two contigous, immiscible fluids.

A major object of the present invention is to provide a method for efficiently transporting two immiscible fluids substantially simultaneously through a common pipeline.

Another object of the present invention is to provide a method for efficiently transporting two immiscible fluids substantially simultaneously through a common pipeline wherein at least one of said fluids has a Reynolds number above about 2000.

An additional object of the invention is to eliminate or substantially reduce the vertical stratification or overriding while occurs when two immiscible fluids are transported in a common pipeline.

Other objects and advantages of the invention will be discerned by the reader as the following, more detailed, description of the invention is read in conjunction with a perusal of the accompanying drawings which illustrate our invention.

In the drawings:

FIGURE 1 is an illustration of the chart of a recording gravitometer used to record the gravity at the interface between gasoline and propane flowing contiguously through a common pipeline. The gravitometer was positioned at a point in the pipeline located two miles from the point of introduction of the propane behind the gasoline.

Figure 2A:
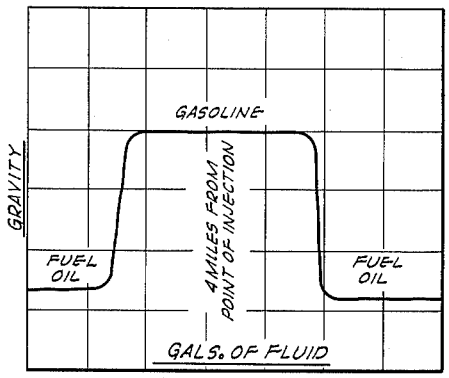
Figure 2B:
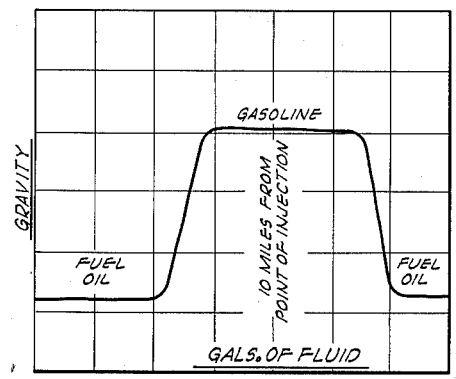

FIGURES 2A and 2B are illustrations of recording gravitometer charts similar to that shown in FIGURE 1, but showing the gravity at the interface between gasoline and number one fuel oil shipped contiguously in the same pipeline. In FIGURE 2A, the gravity has been measured at a point four miles downstream from the point of introduction of the gasoline behind the fuel oil, while in FIGURE 2B, the point of gravity measurement is ten miles from the point at which the gasoline was introduced.

Figure 3A:
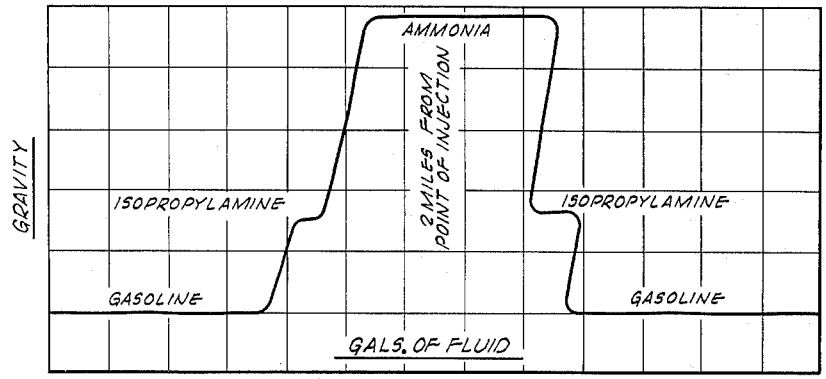
Figure 3B:
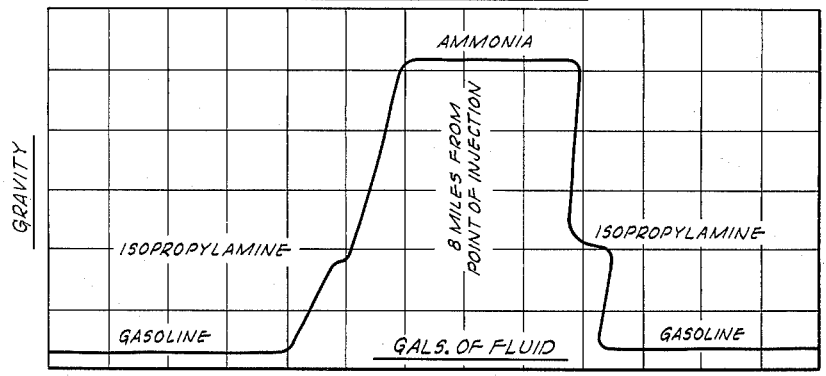
Figure 3C:
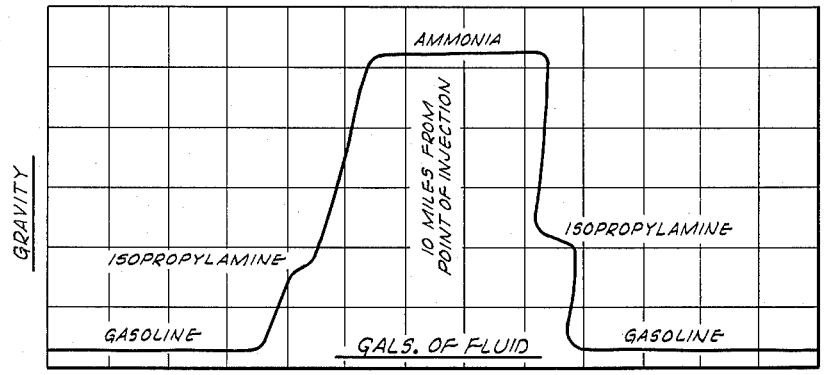

FIGURES 3A, 3B and 3C are gravitometer chart illustrations depicting the variations in fluid gravity at the interfaces between gasoline, isopropyl amine, anhydrous ammonia, isopropyl amine, and gasoline transported contiguously through a common pipeline. FIGURE 3A is a chart derived from a gravity measurement made two miles from the point of introduction of the isopropyl amine and ammonia. FIGURE 3B is based on gravity measurements made at a point eight miles downstream from the point of buffer introduction. FIGURE 3C shows the gravity variation at the interfaces as they passed a point ten miles downstream from the point of introduction.

In its broadest aspect, the process of the invention comprises interposing between two immiscible fluids, a third, or buffer, fluid which is miscible in each of the two fluids.

The intermediate fluid which is employed may be either more viscous, substantially equally viscous, or less viscous than either or both of the fluids which it separates. The difference in density between the intermediate and separated fluids may also be either slight or great. In other words, relative viscosity and density do not appear to be critical properties of the intermediate fluid which will hereinafter be referred to as the buffer fluid. Moreover, whether one or both of the two separated fluids, or the buffer fluid, or all three fluids are in laminar or turbulent flow, that is, has a Reynolds number more or less than about 2000, does not appear to affect the solution to the problem of overriding. In any of these conditions of flow, the buffer fluid still appears to prevent or substantially reduce overriding.

In a more specific, but non-limiting aspect, the invention comprises interposing between two immiscible fluids which are to be transported in a common pipeline, a third, or buffer, fluid which is miscible in each of the two immiscible fluids, and which may be easily separated or recovered from such immiscible fluids after the transport is completed. For instance, if a choice of buffer fluids is available, other factors being equal, preference will ordinarily be given to one having a boiling point which differs from the boiling point of each of the two immiscible fluids by an amount sufficient to permit separation by distillation.

The quantity of the third fluid which is utilized as a buffer will be dependent upon the diameter of the pipeline, the rate of fluid flow and the distance of travel of the fluids. In general, the quantity of the third fluid should be sufficient to assure that the two immiscible fluids which it separates cannot come in contact with each other. As rough rule of thumb, the quantity of buffer fluid which should be used is that amount which is approximately equal to twice the volume of the interface which will exist between the buffer and the fluid ahead of it after these two fluids have travelled over the distance which the three fluids are to be transported.

Examples of suitable fluids which may be interposed between two fluids immiscible in each other to permit the efficient transport thereof in a common pipeline are various alcohols such as methanol, ethanol, iso-propanol, n-butanol and amyl alcohol, which alcohols may be interposed between water and lower molecular weight hydrocarbons, or between phenol and water; acetone for buffering the transport of water or various aqueous solutions and hydrocarbon types immiscible in water, such as higher molecular weight ketones and aliphatic ethers; dioxane for interposition between water or aqueous solutions and such water immiscible ethers and ketones as diethyl ether, ethyl butyl ether, ethyl butyl ketone, ethyl isopropyl ketone, and methyl benzyl ether; lower molecular weight alcohols, such as methanol, ethanol, iso-propanol, n-butanol, and amyl alcohol, for use between water and tetraethyl lead; dimethylamine for buffering between gasoline or other hydrocarbon materials and water; isopropanol for buffering between glycerol and low molecular weight ethers, such as diethyl ether, ethyl isopropyl ether and ethyl butyl ether; stannic chloride for use as a buffer between water and ethers or carbon disulfide; and various alkyl amines such as methyl amine, ethyl amine, isopropyl amine and n-butyl amine for use as a buffer material in separating anhydrous ammonia and gasoline which it desired to ship contiguously.

The tendency of two immiscible fluids to override and become intermixed when transported contiguously in a common pipeline appears to be little affected by the relationship between their gravities or viscosities. Since one inference which might be drawn from Gordon's work is that intermixing is reduced or eliminated when the viscosities or gravities of the contiguous fluids differ substantially, several tests were conducted to evaluate the relation of these parameters to overriding of the fluids.

In the first of these tests, a substantial quantity of water was placed in a 2.125 inch inside diameter pipeline. 850 gallons of gasoline were then injected into the pipeline between slugs of water and the two fluids pumped through the pipeline. The pumping rate was 30 gallons per minute. At this rate, the Reynolds number for the gasoline was 56,000, while that for water was 44,500, thus clearly indicating that both fluids were in turbulent flow.

The interface between gasoline and water (with the gasoline pushing the water) was first observed through a sight glass located about 0.4 mile from the point of injection of the gasoline. At the first detection of the interface at this point, a thin layer of gasoline was stratified on top of the water. The layer of gasoline quickly thickened until approximately one half of the pipe was filled with gasoline. The gasoline layer then gradually continued to thicken until the gasoline completely wedged out the water. The total time required for passage of this stratified interface was 18 minutes. A change from gasoline to oil under identical conditions requires only about 40 seconds. After flowing two miles in the pipeline, the gasoline and water were stratified and intermixed to such an extent that there was neither pure gasoline nor pure water at any point in the pipeline.

It is apparent from the foregoing test that a large difference in density and viscosity of the two immiscible fluids does not alleviate the tendency of the fluids to override or stratify. The viscosity of water is 1.0 centistoke while that of the gasoline used was about 0.78 centistoke. The density of water is 1.0 as compared to about 0.73 for the gasoline.

To further confirm the immateriality of differences in density and viscosity in preventing stratification as between two immiscible fluids, a test was conducted in which a quantity of casinghead gasoline having a specific gravity of about 0.66 and a viscosity of about 0.70 was first placed in the same 2.125 inch I.D. pipeline used in the water-gasoline test. 700 gallons of anhydrous ammonia (viscosity about 0.37 centistoke) were injected into the gasoline and the contiguous fluids then pumped through the pipeline at a rate of 30 gallons per minute. The gravity of the ammonia was 0.60, thus fairly closely approximating that of the gasoline. The rate of pumping of the immiscible fluids was such that each moved in turbulent flow. In the sight glass located 0.4 mile from the point of injection of the ammonia, the interface was observed and it was noted that the ammonia had ridden over the gasoline to such an extent that the interface was 450 gallons long and took 15 minutes to pass the sight glass. The test thus lends itself to the conclusion that the problem of stratification is not substantially reduced in systems involving immiscible fluids differing only slightly from each other in density.

It will be of interest to the reader to know that one of the motivations for selecting ammonia and casinghead gasoline to be tested as two immiscible fluids having relatively close gravities and viscosities was the previous observation of the inventors of an attempt to ship anhydrous ammonia in a pipeline while interposed between fuel oil and a gasoline differing in gravity from the ammonia by a greater degree than the casinghead gasoline discussed above. In this shipment, 435 barrels of the ammonia were injected into a six inch pipeline behind the fuel oil. 100 barrels of the gasoline were then injected behind the ammonia, and these three fluids were then pushed with number two fuel oil (Viscosity —3.2, Density —0.84). The fluids were initially pumped through the pipeline at a rate of 325 barrels per hour until the first fluid arrived at a sampling station 21 miles from the point of injection of the pushing fuel oil. The rate was then slowed to 300 barrels per hour to allow closer sampling. At this pumping rate, the Reynolds number of the gasoline was 142,000, the Reynolds number of the fuel oil was 28,400, and for the ammonia was 296,000, thus indicating that all of the fluids were in turbulent flow. Sampling of the products in the line clearly showed that the ammonia overrode the fuel oil ahead of it and that the gasoline behind it tended to flow under the ammonia.

Since it appeared that the overriding which occurs at the interface between two fluids which are passed contiguously through a common pipeline is due predominantly to the immiscibility of such fluids, and not to the gravity or viscosity thereof, additional tests were conducted using other fluids.

In the first of these tests, about 1000 gallons of propane (Density —0.51) were injected into the previously described 2.125 inch I.D. pipeline into gasoline which was already in the line. The contiguous fluids, followed by additional gasoline, were then pumped through the pipeline at a rate of about 20 to 25 gallons per minute so that the Reynolds number of the propane was approximately 134,000 and that of the gasoline approximately 42,800. After the fluids had passed through two miles of the pipeline, the gravity of the fluids passing a specific point in the pipeline was measured using a recording gravitometer. The trace which was obtained upon the chart of the recording gravitometer is illustrated in FIGURE 1. It will be apparent that the steepness of the two curves which interconnect the horizontal line representing the gravity of pure propane and the horizontal line representing the gravity of the gasoline is a measure of the thickness of the interfaces between the gasoline and propane, or, stated differently, the distance over which the interface extends in the pipeline. Since the slope of these curves is extremely steep excellent interface definition between the two contiguous fluids is indicated. It should be noted that the viscosity of the propane was approximately 0.25 while that of the gasoline was about 0.78. In view of this, the earlier conclusion that a substantial difference in viscosity does not of itself cause overriding is further borne out.

In order to obtain additional data for purposes of evaluating the present invention, about 500 gallons of gasoline having a viscosity of about 0.78 centistoke were injected into a pipeline carrying number one fuel oil having a viscosity of about 2.0 centistoke and a density of about 0.82, and the contiguous hydrocarbons, followed by additional fuel oil, were then pumped through the pipeline at a rate such that the fluids moved in turbulent flow. The gravity of the fluids moving through the pipeline was measured at two points located four miles and ten miles, respectively, from the point of injection of the gasoline. The recorder charts produced from such measurements are illustrated in FIGURES 2A and 2B, respectively. From each of these charts, it will be apparent that the interface between the fuel oil and the gasoline remains well defined over the distances traversed preceding the gravity measurements. In the case of the measurements effected after four miles of transport, the leading interface between the gasoline and fuel oil extended through only approximately 70 gallons of the fluid in the pipeline, while the trailing interface between the gasoline and fuel oil extended over about 63 gallons. After ten miles of transport, the leading interface had become enlarged so as to extend over 142 gallons, while the trailing interface had become elongated sufficiently to extend over 120 gallons of fluid in the pipeline.

In summary, it may be noted from the above information that overriding is a problem when two immiscible fluids are flowed together through a pipeline without regard to the relative density or viscosity of the fluids. This is to be compared with the situation wherein miscible fluids evinced no such problem even when the densities of the fluids were substantially different.

An example of the invention as practiced to prevent stratification and intermixing of two immiscible liquids being transported through a common pipeline is next presented for comparison with the tests involving contiguous transport of immiscible fluids hereinbefore described. Into a pipeline containing a substantial quantity of gasoline having a viscosity of about 0.78 centistoke were injected 600 gallons of anhydrous ammonia which was preceded and followed by approximately 150 gallons of isopropyl amine buffer (Density —0.69) at each end of the ammonia. The viscosity of the isopropyl amine was about 0.60 centistoke, while that of the anhydrous ammonia was about 0.37 centistoke. The inside diameter of the pipeline was 2.125 inches. The fluids, followed by additional gasoline, were pumped through the pipeline at a rate of 30 gallons per minute, or 42.8 barrels per hour. Under these conditions, the Reynolds number of the ammonia was about 118,000, that of the isopropyl amine was about 74,500, while that of the gasoline was approximately 57,000. Thus, all of the contiguous fluids were in turbulent flow.

As the fluids successively passed the sight glass located 0.4 mile downstream from the point of injection of the ammonia and isopropyl amine buffer, it was observed that the interfaces between the several fluids were well defined and that no stratification or overriding had developed.

In addition to visual observation of the interface between the fluids as these boundaries passed the sight glass, gravity measurements were made at points of the pipeline located two miles, eight miles and ten miles from the point of injection of the anhydrous ammonia and isopropyl amine buffer into the pipeline. The recorder chart traces which were developed during the passage of the interfaces by the points at which the gravity of the fluid in the pipeline was being recorded are illustrated in FIGURES 3A, 3B and 3C, respectively.

From the example of the manner in which the invention is practiced utilizing isopropyl amine as a buffer material which is mutually miscible in each of the two immiscible materials to be transported through the pipeline, it is apparent that the interposition of such a mutually miscible material in a pipeline between two immiscible fluids is an effective method of preventing the occurrence of stratification and intermixing of the two immiscible fluids during pipeline conveyance. Other suitable buffer materials may be ascertained by those skilled in the art when the particular pair or pairs of immiscible fluids which are to be contiguously transported in a common pipeline are known. In accordance with the principle underlying the invention, it is only necessary that the buffer fluid selected be miscible in both of the immiscible charges to be transported. It is, of course, further desirable, as hereinbefore indicated, that the factors of economics of supply and ease of product separation and purification be considered in the selection of the buffer where several choices of materials are available.

What we claim and desire to secure by Letters Patent is:

1. The method of transporting by pipeline two immiscible liquids which comprises interposing between said immiscible liquids a liquid which is miscible in each of said immiscible liquids and pumping said liquids through said pipeline under turbulent flow conditions.

2. The method defined in claim 1 wherein said liquid which is miscible in each of said immiscible liquids is further characterized in being easily separable from each of said immiscible liquids.

3. The method defined in claim 2 wherein said immiscible liquid has a boiling point which differs from the boiling point of each of said immiscible liquids by an amount sufficient to permit said separation to be effected by distillation.

4. The method of moving two immiscible liquids in a pipeline at a rate which causes each of said liquids to move in turbulent flow which comprises interposing between said immiscible liquids a liquid which is miscible in each of said immiscible liquids.

5. A process of transporting two immiscible liquids through a pipeline which comprises:
   (a) introducing the first of said liquids into the pipeline;
   (b) introducing a buffer liquid into the pipeline in juxtaposition to said first liquid, said buffer liquid being miscible in each of said two immiscible liquids;
   (c) introducing the second of said two immiscible liquids into the pipeline in juxtaposition to said buffer liquid; and
   (d) pumping the three liquids through said pipeline in turbulent flow.

6. The method of simultaneously transporting by a common pipeline, anhydrous ammonia and a hydrocarbon material which is immiscible in said anhydrous ammonia, which method comprises interposing between the anhydrous ammonia and hydrocarbon material, an alkyl amine which is soluble in both the anhydrous ammonia and the hydrocarbon material, and pumping said ammonia, hydrocarbon material, and alkyl amine through said pipeline in turbulent flow.

7. The method defined in claim 6 wherein said alkyl amine is isopropylamine.

8. The method of simultaneously transporting by a common pipeline, anhydrous ammonia and a hydrocarbon material which is immiscible in said anhydrous ammonia, which method comprises interposing between the anhydrous ammonia and hydrocarbon material, isopropanol which is soluble in both the anhydrous ammonia and the hydrocarbon material, and pumping said ammonia, hydrocarbon material, and isopropanol through said pipeline in turbulent flow.

References Cited by the Examiner
UNITED STATES PATENTS
2,954,146   9/60   Gordon _____ 137—1

References Cited by the Applicant
UNITED STATES PATENTS
306,354    10/84   Schulz.
2,694,404  11/54   Luft et al.
2,706,254   4/55   Mithoff et al.
2,941,537   6/60   Watkins.
2,953,146   9/60   Gordon.
2,958,333  11/60   Poettmann et al.

WILLIAM F. O'DEA, Primary Examiner.
M. CARY NELSON, ISADOR WEIL, Examiners.